July 13, 1926.
R. OPPENHEIM
ELECTRIC BATTERY CELL
Filed March 30, 1923
1,592,222
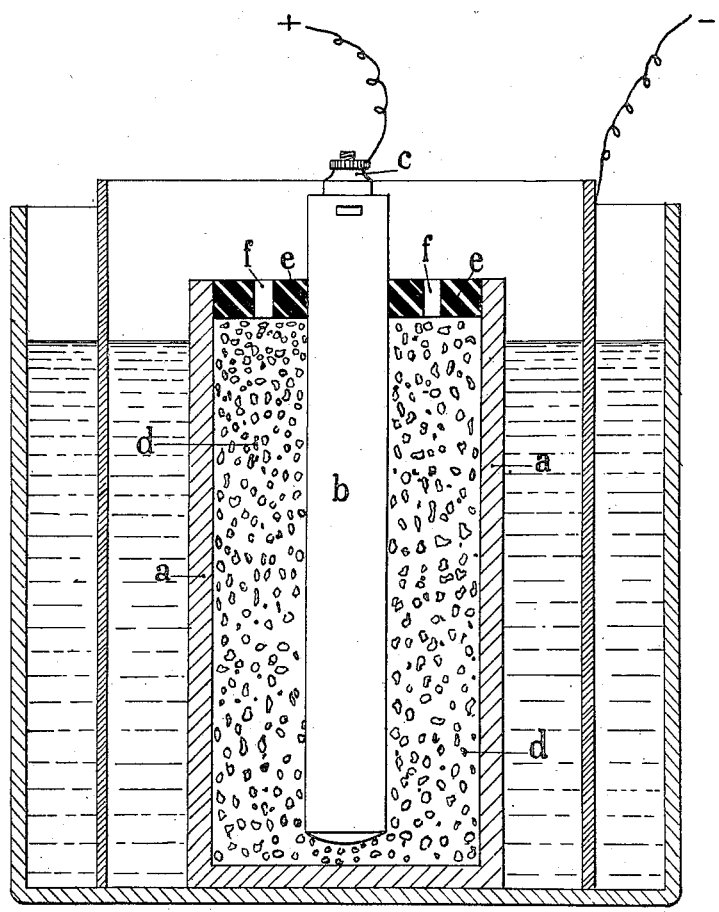
Inventor
R. Oppenheim
By Marks & Clerk
Attys.

Patented July 13, 1926.

1,592,222

UNITED STATES PATENT OFFICE.

RENÉ OPPENHEIM, OF LEVALLOIS-PERRET, FRANCE, ASSIGNOR TO SOCIÉTÉ ANONYME LE CARBONE, OF LEVALLOIS-PERRET, FRANCE.

ELECTRIC-BATTERY CELL.

Application filed March 30, 1923, Serial No. 628,908, and in France February 21, 1923.

It has already been proposed to provide electric cells having the following main characteristic features namely:—

(a) The arrangement, on the positive electrode, of a porous conducting mass in good electrical contact with the latter, and in communication with the atmosphere.

(b) The protection of this porous mass from the moisture of the electrolyte by a suitable coating of colloidal nature, either applied to the porous mass in the form of a coagulated (Fr. "pectisée") skin, or employed in the form of a mass of a certain thickness, and protected in this case by a porous coating that serves to support it and protect it from shocks.

Owing to the want of mechanical strength of this colloidal coating which is impervious to liquid, the porous conducting mass is necessarily constituted in those various proposed forms of cells, by an agglomerate that is of itself resistant to deformation.

The present invention consists in an improvement in that form of cell of the porous positive electrode type with colloidal coating, which is designed to allow of the use of powdered porous materials for the constitution of the porous conducting mass.

The invention also consists in an improved process for the manufacture of such cells.

In an improved cell according to the present invention the positive electrode comprises:—

1. A porous vessel impregnated with a colloidal substance which prevents the liquid from passing through the walls of the said vessel, but allows the gases generated by the reaction during the working of the cell, to pass through the walls of the vessel.

2. A carbon electrode placed in the said vessel.

3. A porous electrically conducting mass in a state of subdivision in the form of powder or grains, capable of absorbing the gases, this porous mass being piled around the carbon electrode in the porous vessel that has been rendered impervious to liquid.

The above described combination has advantages, first as regards economy by reason of dispensing with agglomerates which are expensive to make, and further, as regards electrical output by reason of the fact that the gases generated during the reaction are able to pass easily through powdered substances that are protected from the moisture of the electrolyte.

In order to enable this invention to be more readily understood I will now proceed to describe by way of example one form of the improved cell with special reference to the accompanying drawing which is a central vertical section of the said cell.

In this example:—The positive electrode comprises a porous jar $a$ of ceramic ware, for instance, which has been rendered impervious to the liquid of the electrolyte, yet allows the gases to pass which are generated by the reaction during the working of the improved cell.

This imperviousness may be produced as follows:—The porous jar is immersed in a boiling solution of ordinary soap (for instance, Marseilles soap), containing about 100 grammes of soap per litre of water.

After this immersion, the porous jar is left to dry for a few moments, and is then immersed in a solution of a metallic salt, for instance, a solution of zinc chloride of a strength of about 40 degrees Baumé.

By the reaction of this zinc chloride upon the soap, there is formed in the pores of the porous jar, a zinc soap consisting of zinc oleo-margarate which has the following properties:—it is insoluble in water; it is impervious to liquids; it is pervious to gases and is a good conductor of electricity; moreover this salt is not electrolyzed by the electric current.

Into this porous jar $a$ thus treated there is placed a conducting carbon rod $b$ fitted with a terminal $c$. The porous jar $a$ is then filled with ordinary wood charcoal powder $d$, which is piled around the carbon rod $b$. Finally the porous jar is sealed at the top by a layer of wax $e$ in which holes $f$ are provided to allow of air having access to the wood charcoal powder $d$.

This positive electrode thus formed is placed in a vessel containing the electrolyte, such as a solution of ammonium hydrochlorate in which there is likewise immersed the negative electrode consisting for instance of a plate of zinc. The improved cell thus produced, has the advantage of having a perfectly constant discharge.

The operation of this improved cell may be explained as follows:—

The ionized gases (hydrogen and ammonia) generated by the reaction pass through the colloidal mass with which the porous jar $a$ is impregnated, and on coming into contact with the highly porous wood charcoal powder $d$, they are absorbed by the latter. Owing to the pressure generated in the capillary ducts of this charcoal, the hydrogen combines with the oxygen supplied by the surrounding air. This reaction produces water which dissolves the ammonia. This dissolution of the ammonia has the effect of producing a partial vacuum which promotes the entry of a fresh quantity of gas and atmospheric air into the mass of powdered charcoal $d$.

The operation of the improved cell continues until the wood charcoal has become completely saturated by the water formed as just hereinbefore described.

The rendering of the porous jar impervious to liquid may also be effected by introducing one of the solutions into the said jar, and then plunging the whole into a tank containing the other solution. The two solutions penetrate by dialysis into the pores of the porous jar, and react upon one another in the interior of those pores. In this case the skin of zinc oleo-margarate is formed in the mass and is thus completely protected.

According to a modification the improved cell of this invention may be produced by employing, instead of a porous jar of ceramic ware, a bag composed of a fabric made of hemp, jute or cotton, rendered impervious to liquid in the manner hereinbefore described. In this modification instead of a liquid solution of salt, there may be employed a colloidal solution of low strength which has the advantage of adhering more strongly to the meshes of the fabric.

The positive electrode as hereinbefore described, may be employed in the constitution of a dry cell. In such a case, this electrode, instead of being immersed in a liquid solution of ammonium hydrochlorate, is immersed in a solution of electrolyte rendered solid by any suitable means employed in the manufacture of dry cells.

The improved positive electrode constituted as hereinbefore described, is suitable for use in wet cells and in dry cells comprising a metal negative electrode and an electrolyte composed of a solution of an electrolyzable salt.

Claims:

1. In an electric battery cell, a positive electrode comprising a porous vessel, a colloidal electricity conducting material impregnating said vessel and capable of forming, by contact with the porous vessel, a pectized film for preventing the penetration of liquid through said vessel while allowing the passage of gases through the vessel, a carbon electrode in said vessel, and an absorbent porous electricity conducting mass, in a state of sub-division, arranged around the carbon electrode in the porous vessel.

2. In an electric battery cell, a positive electrode comprising a porous vessel, a colloidal electricity conducting material impregnating said vessel and capable of forming, by contact with the vessel, a pectized film for preventing the penetration of liquid through the vessel while permitting the passage of gases through the vessel, a carbon electrode in said vessel and an absorbent porous electricity conducting mass, in the form of powder, arranged around said carbon electrode in the porous vessel.

3. In an electric battery cell, a positive electrode comprising: a porous vessel,—a colloidal precipitate of metal oleo-margarate impregnating this vessel,—a carbon electrode introduced in the said vessel,—an absorbent porous electrically conducting mass, in a state of subdivision, piled around this carbon electrode in the porous vessel.

4. In an electric battery cell, a positive electrode comprising: a porous vessel,—a colloidal precipitate of zinc oleo-margarate impregnating this vessel,—a carbon electrode introduced in the said vessel,—an absorbent porous electrically conducting mass, in a state of subdivision, piled around this carbon electrode in the porous vessel.

5. An electric battery cell comprising a positive electrode as claimed in claim 1, a metallic negative electrode and an electrolyte constituted by an electrolyzable salt solution.

The foregoing specification of my "improvements in electric battery cells and in the process of manufacture of same", signed by me this 16th day of March, 1923.

RENÉ OPPENHEIM.